US006101706A

United States Patent [19]

[11] Patent Number: 6,101,706

[45] Date of Patent: Aug. 15, 2000

Roy

[54] STABILIZING MECHANISM FOR A HINGE POSITIONER FIXTURE

[75] Inventor: Michael Roy, Brampton, Canada

[73] Assignee: DaimlerChrysler Corporation, Auburn Hills, Mich.

[21] Appl. No.: 09/277,884

[22] Filed: Mar. 29, 1999

[51] Int. Cl.[7] ............................ B23P 21/00; B25B 27/14; G01D 21/00

[52] U.S. Cl. ............................ 29/714; 29/281.5; 33/600; 33/645

[58] Field of Search ................................ 29/11, 709, 714, 29/715, 434, 281.1, 281.5, 464; 33/600, 608, 613, 645, 533, 573

[56] References Cited

U.S. PATENT DOCUMENTS

| | | | |
|---|---|---|---|
| 1,917,239 | 7/1933 | Chester . | |
| 2,205,339 | 6/1940 | Blessings | 33/613 |
| 4,432,144 | 2/1984 | Carlsson | 33/608 X |
| 4,579,485 | 4/1986 | Connor et al. . | |
| 4,589,184 | 5/1986 | Asano et al. | 29/430 |
| 5,033,163 | 7/1991 | Kaibuki | 16/386 |
| 5,181,307 | 1/1993 | Kitahama et al. | 29/434 |
| 5,560,112 | 10/1996 | Stein et al. | 33/194 |

FOREIGN PATENT DOCUMENTS

| | | |
|---|---|---|
| 8-039364 | 2/1996 | Japan . |

*Primary Examiner*—S. Thomas Hughes
*Assistant Examiner*—Eric Compton
*Attorney, Agent, or Firm*—Lawrence J. Shurupoff

[57] ABSTRACT

A pair of hinges can be positioned on an automotive body for assembly fastening purposes, using a manual fixture that includes spaced pegs for locating the fixture in a desired position on the body. Three or more clamps on the fixture can be controlled to automatically clamp the fixture to the auto body after the fixture has been manipulated to a desired position. The process of aligning the spaced pegs with locator holes on the auto body is facilitated by a stabilization pin carried by the fixture. The stabilization pin and the two pegs provide a stable three point support for the fixture while the fixture is being manipulated to align the pegs with the locator holes.

8 Claims, 3 Drawing Sheets

STABILIZING MECHANISM FOR A HINGE POSITIONER FIXTURE

CROSS-REFERENCE TO RELATED APPLICATIONS

This application is related to co-pending U.S. patent applications, Ser. No. 09/277,900, pending filed on Mar. 29, 1999, entitled "Adjustable Locator Mechanism for a Hinge Positioner Fixture," Ser. No. 09/280,950, pending filed on Mar. 29, 1999, entitled "Mechanism for Positioning a Pair of Hinges on an Automobile Body," Ser. No. 09/280,951 pending filed on Mar. 29, 1999, entitled "Mechanism for Removing a Hinge-Positioner Fixture from an Automobile Body," Ser. No. 09/277,883, allowed filed on Mar. 29, 1999, entitled "Precision Indexing of a Turntable Used in a Hinge-Positioner Fixture."

BACKGROUND OF THE INVENTION

1. Field of the Invention

This invention relates to a mechanism for positioning a pair of hinges on an automobile body so that the hinges can be fastened to the body in precise operating positions. The invention can be used on various types of auto bodies, e.g. passenger cars, trucks, or vans.

2. Description of Prior Developments

In the automobile production assembly process, the door hinges are sometimes installed on the automobile body while the body is in an unpainted condition on a moving conveyor. The hinges are usually installed on the auto body before the doors have been fastened to the hinges.

SUMMARY OF THE INVENTION

The present invention relates to a mechanism for positioning a pair of hinges on an auto body along one edge of a door opening so that the hinges are aligned in proper operating position before the hinges are fastened to the body.

The mechanism of the present invention includes a fixture movable to a clamped condition on the auto body, and a mechanism on the fixture for releasably holding a pair of hinges in a predetermined position on the fixture, so that when the fixture is clamped to the auto body the hinges will be aligned in desired positions on the auto body. The fixture is preferably suspended from an overhead balancing device, so that a human operator can manipulate the fixture without having to carry the entire fixture weight. The overhead balancing device allows the fixture to be moved with the automobile body while the body is being moved on a conveyor past a hinge attachment station.

The invention has a semi-automatic operational mode, such that the fixture is automatically clamped to the auto body when the human operator has been able to manipulate the fixture to a predetermined position on the auto body. The human operator can concentrate on manipulating the fixture without having to worry about using one hand to control or operate the clamping mechanism.

The means for releasably holding the door hinges on the fixture includes a magnetic mechanism for temporarily retaining the hinges on the fixture when the hinges are manually placed on the fixture, and a powered mechanism for securely holding the hinges in desired positions after the fixture has been clamped to the auto body. An aim of the invention is to free the hands of the human operator for easier manipulation of the fixture into a desired final position on the auto body.

The present invention is more particularly concerned with a bracket carried by the fixture for stabilizing the fixture while the fixture is being manipulated into a position where it can be clamped to the auto body. The stabilizing bracket includes a pin that can slide on the auto body surface to keep the fixture parallel to the auto body surface.

Specific features of the invention will be apparent from the attached drawings and description of a preferred embodiment of the invention.

DESCRIPTION OF A PREFERRED EMBODIMENT OF THE INVENTION

Figure 1:
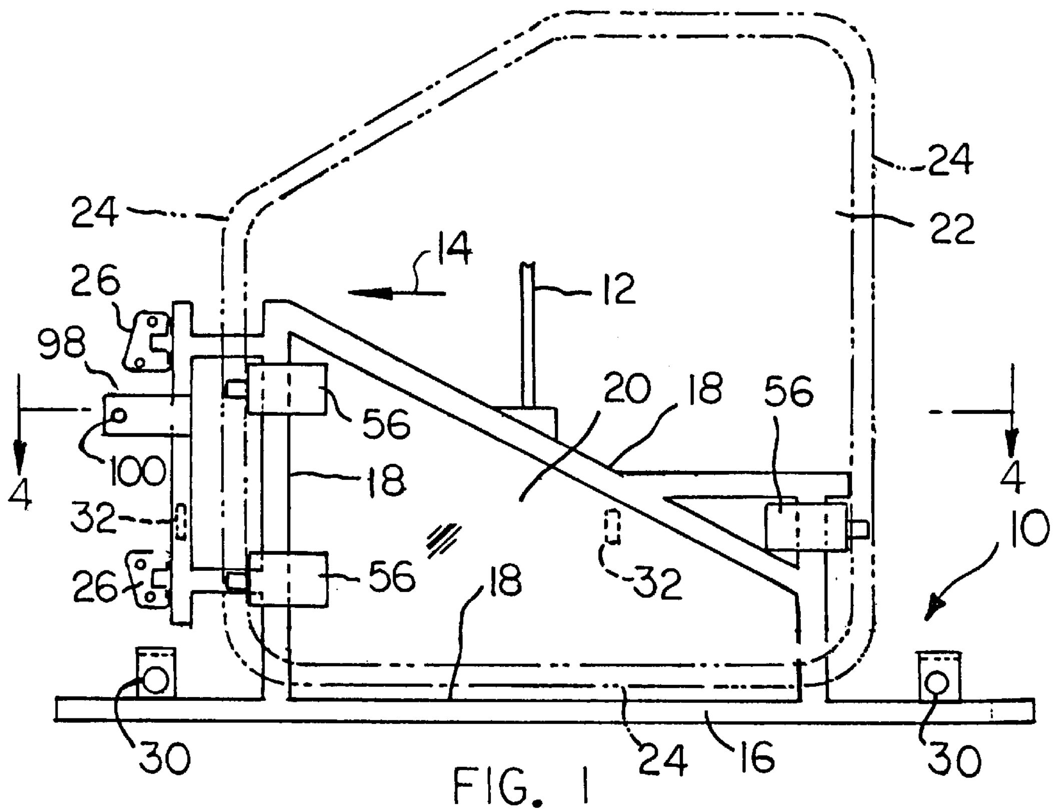
FIG. 1 is an elevational view of a hinge-positioning mechanism embodying the invention. An automobile door opening is superimposed in dashed lines on the mechanism to show the operational orientation of the mechanism relative to the automobile.

Referring to FIG. 1, there is shown a semi-automatic mechanism embodying the invention. The mechanism includes a portable fixture 10 suspended from an overhead balancing device by means of a cable 12, whereby the fixture weight is carried by the balancing device, while permitting a human operator to move the fixture in three dimensions, i.e. into or out of the plane of the paper, up or down, and/or right and left.

Additionally, the overhead balancing device permits the fixture to be moved laterally with an automobile body, as the body is conveyed generally in the direction of arrow 14 (right-to-left in FIG. 1).

Fixture 10 includes a frame 16 formed of light weight aluminum tubes 18 suitably welded together in a uni-planar arrangement (i.e. vertically in FIG. 1). A flat panel 20 is secured to one face of frame 16 to provide support for wiring and pneumatic hoses employed in the practice of the invention. Major operating components can be supported on the aluminum frame. The tubes used to form the frame are preferably formed of square cross-section tubing. Some frame elements can be formed out of aluminum bar stock.

As shown in FIG. 1, fixture 10 is positionable alongside an automobile body in facing relation to a door opening 22 defined by a peripheral flange 24 on the sheet metal portion of the body. The door opening depicted in FIG. 1 is designed to receive a front door at a subsequent point in the auto assembly process. The present invention is concerned with a mechanism for positioning two door hinges 26 on the auto body while the hinges are being fastened to the body, as by means of bolts or rivets (not shown). The fastening tool used for fastening the hinges is not part of the invention. FIG. 1 is taken from a point inside the automobile body, looking toward the hinge-positioning mechanism, with hinges 26 pre-located on the positioning fixture.

The invention includes two horizontally-spaced cylindrical pegs 30,30 supported by fixture 10 for insertion into pre-formed holes in the auto inner body, i.e. the body skeleton prior to placement of the fender panels and rocker panels on the skeleton. The pre-formed holes will be covered by the outer rocker panel or fender panel at a later point in the manufacturing process.

Cylindrical pegs 30 are very important in this invention, in that they serve as locators for fixture 10 on the automobile body. The position of fixture 10 determines the position of hinges 26 on the automobile body. Placement of pegs 30,30 in the pre-formed holes in the auto body is accomplished by manual manipulation of fixture 10. Handles 32,32 on the hidden side of the fixture enable the human operator to manipulate the fixture to a desired position on the automobile body.

Prior to manipulation of fixture 10 into engagement with the auto body, the two hinges 26,26 are manually placed on a hinge positioning assembly 34 suitably affixed to frame 16. The two hinge-positioning assemblies may be similarly constructed. A representative hinge-positioning assembly is shown in FIGS. 2 and 3.

Figure 2:
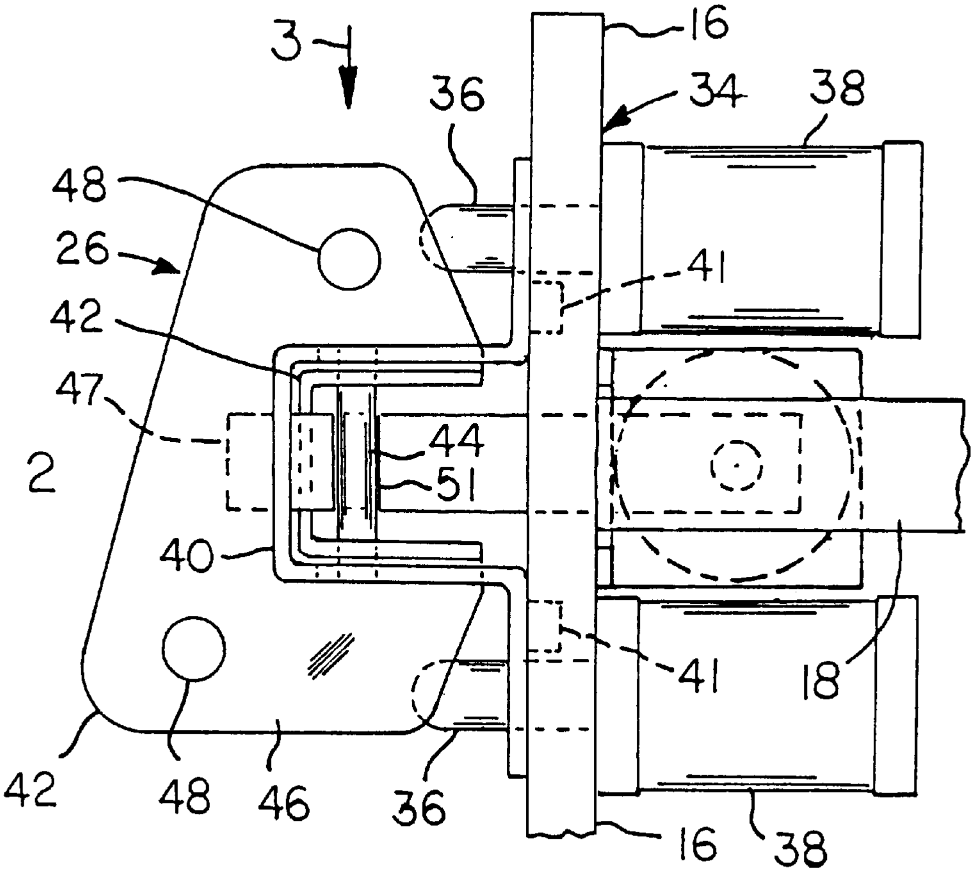
FIG. 2 is a view taken in the same direction as FIG. 1, but showing a hinge-holding mechanism enlarged.
Figure 3:
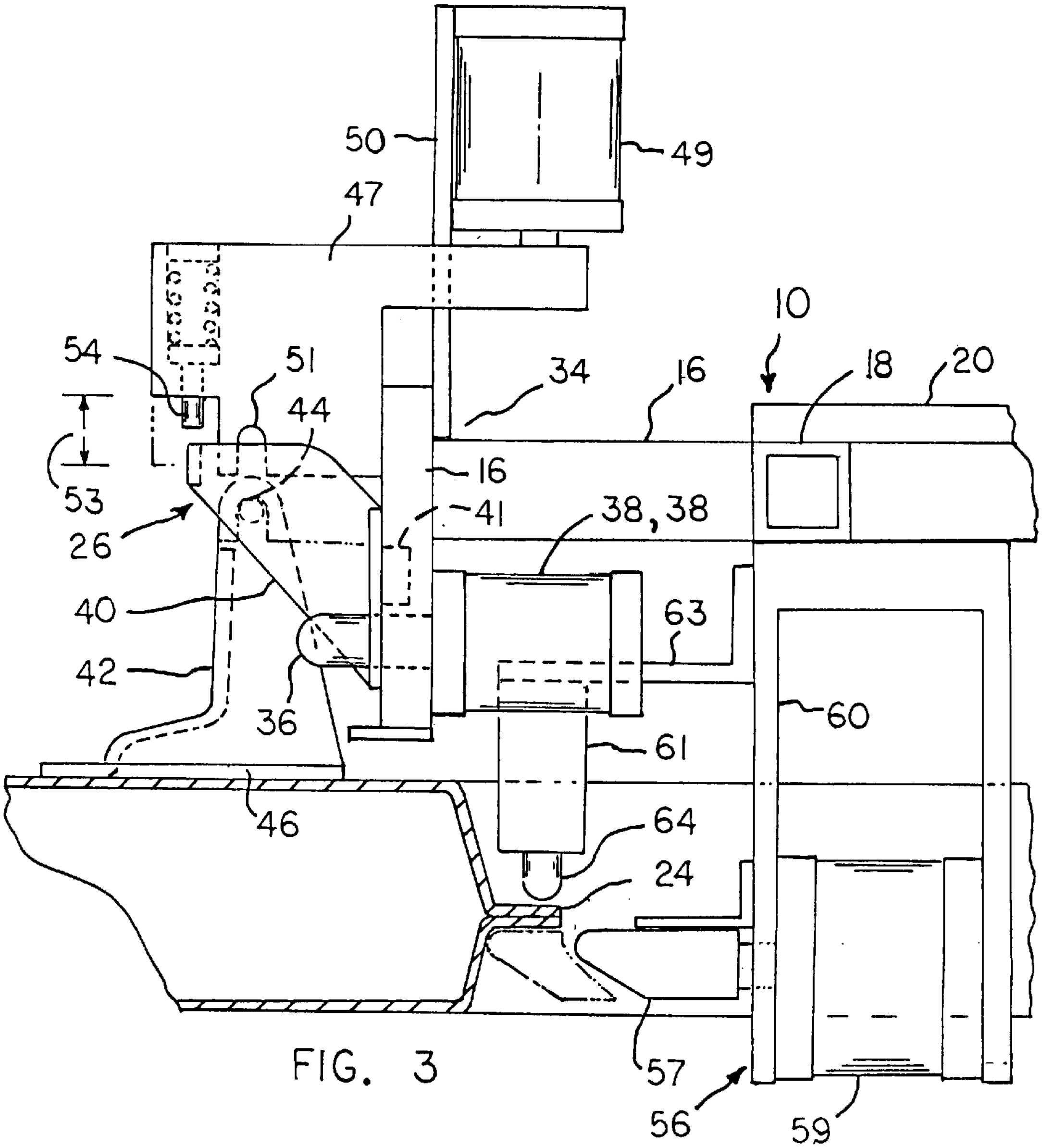
FIG. 3 is a fragmentary view taken in the direction of arrow 3 in FIG. 2.

The hinge-positioning assembly 34 depicted in FIGS. 2 and 3 includes two cylindrical pins 36 affixed to the pistons of pneumatic cylinders 38 suitably mounted on frame 16. As shown in FIGS. 2 and 3, pins 36 are extended from frame 16 to pass through the fastener holes for the door section 40 of hinge 26. When the cylinders 38 are actuated to retract the pistons, pins 36 move into the frame 16 to free the hinge section from the frame. Each hinge is initially placed on frame 16 with pins 36 in the extended positions.

In order to ensure that hinge section 40 will remain on frame 16, two permanent magnets 41 are embedded, or otherwise attached, to the frame surface that receives the mounting flanges of the hinge door section 40. Magnets 41 act as magnetic clamps to releasably clamp hinge section 40 to frame 16. Pins 36 act as locators for hinge section 40.

Door section 40 of each hinge 26 is swingably connected to the associated auto body section 42 of the hinge by a hinge pin 44. Hinge section 42 has flanges 46 adapted to seat on the outer surface of the automobile body, as shown in FIG. 3. The hinge is secured to the auto body by means of bolts or rivets passed through fastener holes 48 (FIG. 2) in flanges 46. Any suitable powered fastener tool can be used to secure the hinge fasteners to the auto body.

To augment the clamping action of permanent magnets 41, there is provided a movable yoke 47 powered by a pneumatic cylinder 49. As shown in FIG. 3, cylinder 49 is mounted on a bracket 50 extending from the aluminum frame 16 (any suitable means can be used to mount the pneumatic cylinder). Yoke 47 includes a wall structure slidably supported on the left face of frame 16, whereby the yoke means can slide on the frame linearly but cannot rotate around the cylinder 49 axis.

Yoke 47 has a notch (or slot) 51 adapted to partially encircle hinge pin 44 when cylinder 49 is actuated. FIG. 3 shows cylinder 49 in the retracted condition. When the cylinder is actuated (pressurized) yoke 47 advances downwardly through a stroke distance 53 (FIG. 3), whereby notch 51 partially encircles hinge pin 44. Yoke 47 prevents hinge section 40 from being displaced from its pre-located position on frame 16, especially when hinge section 42 is in the process of being fastened to the auto body. Additionally the yoke limits swinging motion of hinge section 42.

Yoke 47 is provided with a spring-biased abutment pin 54 that resiliently engages the center web portion of the hinge section 40, so that the hinge assembly is indirectly brought into pressure contact with the auto body. Flanges 46 on hinge section 42 have pressure contact with the auto body surface while the hinge fasteners are being attached to the auto body. Pneumatic cylinder 49 can be actuated before, or after, frame 16 is manipulated to the desired position on the auto body (by causing cylindrical pegs 30 to enter into the pre-formed locator holes in the auto body).

Fixture 10 is equipped with three clamping mechanisms 56 for clamping the fixture to the auto body prior to the step of fastening hinges 26 to the body. As shown in FIG. 1, one of the clamping mechanisms 56 is located on frame 16 proximate to the uppermost hinge 26. A second clamping mechanism 56 is located on frame 16 near the lowermost hinge 26. A third clamping mechanism is located on frame 16 at the opposite edge of the door opening 24 (i.e. the edge of the door opening remote from the hinges). Each clamping mechanism may be similarly constructed.

FIG. 3 shows the general construction of the clamping mechanisms. Each clamp mechanism includes a slidable clamp element 57 attached to the piston of a pneumatic cylinder 59 that is suitably mounted on a bracket 60 extending from frame 16. When cylinder 59 is energized (pressurized) clamp element 57 is extended to the dashed line position behind flange 24, thereby clamping fixture 10 to the auto body (with flanges 46 of each hinge 26 in firm contact with the auto body surface).

In order to ensure that all three pneumatic cylinders 59 are energized simultaneously at the optimum time in the cycle, the three cylinders 59 are collectively controlled by three separate proximity switches suitably mounted on frame 16 near the respective cylinders 59. FIG. 3 shows one proximity switch 61 attached to frame 16, via a bracket 63, so that the sensing head 64 of the switch is located near auto body flange 24 when frame 16 is in its desired position on the auto body (as determined by cylindrical pegs 30 in FIG. 1). Each proximity switch 61 is similarly mounted.

Each proximity switch 61 is adjusted so that when the associated clamp element 57 is in a plane behind flange 24 (as shown in FIG. 3) the sensing head 64 responds to the presence of auto body flange 24 to trigger the switch to the conductive state. Switches 61,61,61 are connected electrically in series in the control circuit for the valves that supply pressurized fluid to fluid cylinders 59, such that all three switches are required to be triggered before any of the cylinders are pressurized (actuated). All three cylinders are actuated simultaneously after fixture 10 assumes its final position on the auto body (as sensed by the three proximity switches 61).

The clamping action of clamp elements 57 occurs automatically when fixture 10 reaches the desired position on the auto body, since all three proximity switches 61 have to be triggered before the cylinders 59 are pressurized. The human technician operator can devote attention to the process of manipulating fixture 10, without having to worry about removing one hand from a handle 32 in order to manually operate a control switch. The operation saves time and ensures that fixture 10 will be in the correct position on the auto body when clamping mechanisms 56 are actuated.

After the two hinges 26 have been fastened to the auto body, a manual switch on fixture 10 can be operated to release the mechanism from the auto body. A timer controlled by the manual switch can be employed to sequentially retract each yoke 47 from the associated hinge pin 44, and to retract hinge locator pins 36 from hinge sections 40. The timer can be further cycled to depressurize the three pneumatic cylinders 59, so that the technician can remove fixture 10 from the auto body.

The entire process, from initial placement of hinges 26 on the locator pins 36 to final separation of fixture 10 from the auto body, can be accomplished relatively quickly while the automobile body is being moved along the conveyor line.

As previously noted, fixture 10 is located at a predetermined position on the auto body by means of the two locator pegs 30,30. The human operator holds handles 32,32 for manipulating fixture 10 along the auto body to a position where pegs 30,30 enter into the locator holes in the auto body.

Figure 4:
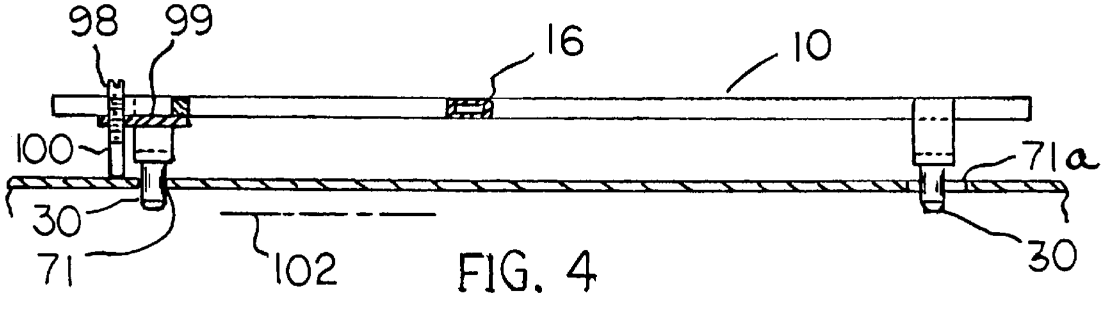
FIG. 4 is a fragmentary sectional view taken on line 4—4 in FIG. 1.

FIG. 4 shows the two pegs 30,30 inserted into locator holes 71 and 71*a* in the auto body. Locator hole 71 is a circular hole having a close tolerance fit on the associated cylindrical peg 30. Locator hole 71*a* can be a horizontal slot that is elongated in the horizontal direction while having a close tolerance fit on the associated cylindrical peg 30 in the vertical direction.

The front peg 30 effectively anchors fixture 10 in the front-to-rear direction. The rear peg 30 prevents movement of the fixture in the vertical direction.

Pegs 30,30 have the best possibility for entry into locator holes 71,71*a* if frame 16 is in an upright (vertical) orientation. To ensure an upright orientation of frame 16, there is provided a fixture stabilizing mechanism 98.

As shown in FIG. 1 and 4, the stabilization mechanism includes a bracket 99 attached to frame 16 above the front peg 30, and a slide pin 100 threaded into the bracket for axial adjustment parallel to the peg 30 axis.

The leading end of slide pin 100 is spaced slightly behind an imaginary plane 102 defined by the leading ends of pegs 30,30, such that the pegs can enter into the locators holes 71,71*a* without interference from slide pin 100.

While the human operator is manipulating the fixture 10 along the auto body (to align pegs 30,30 with locator holes 71,71*a*) the two pegs 30,30 and slide pin 100 provide a three point support for the fixture on the auto body surface. The human operator can slide fixture 10 (frame 16) vertically and horizontally while keeping frame 16 generally parallel to the auto body surface. When the front peg 30 finds the front locator hole 71 (or the rear peg 30 finds locator hole 71*a*) the peg can move into the hole easily, without binding on the hole edge surface. Once one of the pegs 30 is in the associated locator hole (71 or 71*a*) the fixture can be readily manipulated to position the other peg in its locator hole.

Hinges 26 are not shown in FIG. 4, in order to illustrate the stabilizer pin 100. However, hinges 26,26 are located on fixture 10 so that the surfaces of flanges 46,46 on each hinge are in approximately planar alignment with the end surface of pin 100 when pegs 30,30 are inserted through locator holes 71,71. Pin 100 stabilizes the fixture to minimize any tendency of the hinge sections 42 to swing or wobble around hinge pin 44 in a way as to interfere with insertional movements of pegs 30,30 into locator holes 71.

The stabilizing action provided by bracket 99 and slide pin 100 is advantageous in that a three point support is achieved while fixture 10 is being manipulated. The fixture is maintained in a suitable plane for best entry of pegs 30,30 into locator holes 71,71*a*.

Stabilization mechanism 98 reduces the time required to insert pegs 30,30 into locator holes 71, 71*a*. The stabilization mechanism thereby makes the job less difficult, in that the human operator is ensured of completing the hinge-fastener operation in the available time period (before arrival of the next auto body at the hinge-fastener station).

The drawings necessarily show a specific apparatus useful in practice of the invention. However, it will be appreciated that variants can be employed while still practicing the invention.

What is claimed:

1. A mechanism for positioning a pair of hinges in aligned positions on an automobile body adjacent to a door opening, to facilitate a hinge-fastening operation, said mechanism comprising:

a hinge-support fixture having first means for supporting an upper hinge and second means for supporting a lower hinge; said fixture being manually movable to a predetermined position on an automobile body;

means for locating said fixture in said predetermined position on the automobile body;

means carried by said fixture for releasably clamping said fixture to an automobile body to facilitate a hinge-fastener operation; and said fixture locating means comprising a front peg insertable into a first pre-formed locator hole in the auto body, and a rear peg insertable into a second pre-formed hole in the auto body; and means for stabilizing said fixture on the auto body while the fixture is being manipulated to a position wherein said pegs are aligned with the locator holes in the auto body;

said stabilizing means comprising a slide element projecting from the fixture in the space above the front peg;

said slide element and said pegs forming a three point support for the fixture on the auto body surface, whereby the fixture can be manipulated along the auto body surface until at least the front peg moves into the first locator hole in the auto body.

2. The mechanism of claim 1, wherein said slide element has a leading surface spaced slightly closer to the fixture than leading surfaces of the first and second pegs, whereby said slide element allows the front peg to move into the first locator hole in the auto body.

3. The mechanism of claim 1, wherein said stabilizing means comprises a bracket for supporting said slide element; said slide element comprising a slide pin adjustably positioned on the bracket, so that the leading end of said slide pin can be adjusted incrementally toward or away from an imaginary vertical plane defined by the ends of the first and second pegs.

4. The mechanism of claim 3, wherein said slide pin is adjustable in a direction that is parallel to the axis of said first and second pegs.

5. The mechanism of claim 1, wherein said slide element is located a substantial distance above said front peg.

6. The mechanism of claim 1, wherein said slide element is located between said first and second hinge-supporting means, said slide element being spaced a substantial distance above the front peg.

7. The mechanism of claim 1, and further comprising two spaced pegs carried by said fixture for insertion into pre-formed holes in the automobile body, whereby the fixture is oriented to the body prior to actuation of said clamping means.

8. The mechanism of claim 1, and further comprising plural proximity switches carried by said fixture for controlling said clamping means so that the clamping means is actuated only when all of said proximity switches detect a particular orientation of the automobile body relative to the clamping means.

* * * * *